(12) United States Patent
Quintero Perez et al.

(10) Patent No.: US 9,855,924 B2
(45) Date of Patent: Jan. 2, 2018

(54) AUTONOMOUS ECOLOGIC RAINWATER COLLECTION SYSTEM FOR REPLENISHING WASHER FLUID IN A MOTOR VEHICLE

(71) Applicant: FORD GLOBAL TECHNOLOGIES, LLC, Dearborn, MI (US)

(72) Inventors: Francisco Javier Quintero Perez, Uruapan (MX); Erick Garcia Dominguez, Tlalnepantla de Baz (MX); Jonatan Leff Yaffe, Mexico City (MX); Joan Manuel Hernandez, Tlalnepantla de Baz (MX)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/019,060

(22) Filed: Feb. 9, 2016

(65) Prior Publication Data

US 2017/0225658 A1   Aug. 10, 2017

(51) Int. Cl.
*B60S 1/48* (2006.01)
*B62D 25/10* (2006.01)
(Continued)

(52) U.S. Cl.
CPC .............. *B60S 1/481* (2013.01); *B60L 1/003* (2013.01); *B60S 1/50* (2013.01); *B60W 40/105* (2013.01);
(Continued)

(58) Field of Classification Search
CPC . B60S 1/481; B60S 1/50; B60L 1/003; B62D 25/105; B60W 40/105; B60W 2550/12
(Continued)

(56) References Cited

U.S. PATENT DOCUMENTS 3,738,575 A * 6/1973 Somer ................... B60S 1/50
239/284.1
5,669,986 A * 9/1997 Buchanan, Jr. ...... B62D 25/081
134/123
(Continued)

FOREIGN PATENT DOCUMENTS

DE        4101820 A1   7/1992
DE        4436023 A1   4/1995
(Continued)

OTHER PUBLICATIONS

English Machine Translation of DE19912294A1.
(Continued)

*Primary Examiner* — Jason S Morrow
*Assistant Examiner* — E Turner Hicks
(74) *Attorney, Agent, or Firm* — Jason Rogers; King & Schickli, PLLC

(57) ABSTRACT

A rainwater collection system is provided for a motor vehicle. That rainwater collection system includes a rainwater collector, a gate for the rainwater collector and a controller. The controller is configured to open and close the gate in response to data input respecting the occurrence of precipitation, a level of windshield washer fluid in a windshield washer system of the motor vehicle and in accordance with other monitored parameters including motor vehicle speed and battery voltage level. A related method is also disclosed.

17 Claims, 4 Drawing Sheets

(51) Int. Cl.
  *B60S 1/50* (2006.01)
  *B60L 1/00* (2006.01)
  *B60W 40/105* (2012.01)
(52) U.S. Cl.
  CPC ....... *B62D 25/105* (2013.01); *B60W 2550/12* (2013.01)
(58) Field of Classification Search
  USPC .......................... 296/193.11, 96.15, 93, 154
  See application file for complete search history.

(56) References Cited

U.S. PATENT DOCUMENTS

| | | | | |
|---|---|---|---|---|
| 6,024,803 | A * | 2/2000 | Buchanan, Jr. | ........... B60S 1/50 134/123 |
| 6,266,842 | B1 * | 7/2001 | Muller | ................... B60S 1/481 15/250.01 |
| 8,911,523 | B2 * | 12/2014 | Marx | ....................... B60H 1/28 123/198 E |
| 9,000,000 | B2 * | 4/2015 | Carroll | ...................... B60S 1/48 134/109 |
| 9,120,465 | B2 | 9/2015 | Uyanik et al. | |
| 9,434,356 | B1 * | 9/2016 | Puente Fernandez | .... B60S 1/50 |
| 2002/0193946 | A1 * | 12/2002 | Turnbull | ............ G01C 21/3626 701/493 |
| 2013/0206266 | A1 | 8/2013 | Stenhouse | |
| 2013/0240419 | A1 * | 9/2013 | Carroll | ..................... B60S 1/48 210/95 |

FOREIGN PATENT DOCUMENTS

| | | |
|---|---|---|
| DE | 19912294 A1 | 9/2000 |
| GB | 2315994 A | 2/1998 |

OTHER PUBLICATIONS

English Machine Translation of DE4101820A1.
English Machine Translation of DE4436023A1.
"World's 1st Fully Automated Self-Filling Windshield Washer System"; Sema Show; https://www.semashow.com/press/2011/09/24/world%E2%80%99s1stfullyautomatedselffillingwindshieldwashersystem; printed Dec. 4, 2015; p. 1/1.

* cited by examiner

AUTONOMOUS ECOLOGIC RAINWATER COLLECTION SYSTEM FOR REPLENISHING WASHER FLUID IN A MOTOR VEHICLE

TECHNICAL FIELD

This document relates generally to the motor vehicle equipment field and, more particularly, to an intelligent rainwater collection system as well as to a method of autonomous ecologic rainwater collection for a motor vehicle windshield washer system.

BACKGROUND

The maintaining of a clean windshield for utmost driver visibility is paramount to the safe operation of a motor vehicle. To meet this goal, motor vehicles are equipped with windshield washing systems comprising a reservoir of windshield washer fluid and a pump for pumping that fluid through spray jets onto the windshield. Windshield wipers are then used to sweep that windshield washer fluid and any dirt and debris from the windshield.

Typically the windshield washer fluid reservoir is located under the hood where it is out of sight and out of mind of the motor vehicle operator. As a result, the windshield washer fluid reservoir is often at or near empty when it is most needed by the motor vehicle operator to clean the windshield. This document relates to a new and improved intelligent rainwater collection system and an associated method of autonomous ecologic rainwater collection for a motor vehicle windshield washer system which represents a significant advance in the art.

SUMMARY

In accordance with the purposes and benefits described herein, a rainwater collection system is provided for a motor vehicle. That rainwater collection system comprises a rainwater collector, a gate for the rainwater collector and a control configured to open and close the gate to the rainwater collector in response to data respecting (a) the occurrence of precipitation and (b) a level of windshield washer fluid in a windshield washer system of the motor vehicle.

The controller may also be configured to open or close the gate in response to data input respecting a voltage level of a battery of the motor vehicle.

In accordance with an additional aspect, a rainwater collection system for a motor vehicle includes: (a) a rainwater collector including a static rainwater collection section and a dynamic rainwater collection section, (b) a first gate and a first driver for said static rainwater collection section, (c) a second gate and a second driver for said dynamic rainwater collection section and (d) a controller. That controller is configured to open or close the first and second gates in response to data input respecting detection of precipitation and the level of windshield washer fluid in the windshield washer system of the motor vehicle. In such an embodiment, the controller may also be configured to open or close the static rainwater collection section or the dynamic rainwater collection section in response to data input respecting a current speed of the motor vehicle.

Further, the rainwater collection system may include a windshield washer fluid level sensor, a rain sensor, a battery voltage level sensor and/or a motor vehicle speed sensor. Further, the controller may be configured to have data inputs connected to the windshield washer fluid level sensor, the rain sensor, the battery voltage level sensor and/or the motor vehicle speed sensor.

In one possible embodiment, the static collection section includes an upwardly opening recess on an exposed surface of the motor vehicle and the dynamic collection section includes an opening directed motor vehicle forward and in communication with that upwardly opening recess. Still further, the upwardly opening recess and the forwardly directed opening may be provided on a hood of the motor vehicle. In addition, the rainwater collection system may also include a solar cell and a battery for powering the controller and the drive motor of the system.

In accordance with an additional aspect, a method of autonomous ecological rainwater collection for a motor vehicle windshield washer system is provided. That method may be described as comprising the steps of: (a) monitoring, via a first device/sensor, for ongoing precipitation, (b) monitoring, via a second device/sensor, a level of windshield washer fluid in the motor vehicle windshield washer system and (c) opening, via a controller, a rainwater collector for collection of rainwater when precipitation is detected and the rainwater washer fluid is below a predetermined level.

In yet another possible embodiment, the method may include monitoring, by a third device/sensor, a current speed of the motor vehicle and opening, via a controller, a dynamic rainwater collection section of the rainwater collector for collection of rainwater when falling rain is detected, the windshield washer fluid is below the predetermined level and current motor vehicle speed is above a predetermined speed. Still further, the method may include the step of monitoring, by a third device/sensor, a current speed of the motor vehicle and opening, via a controller, a static rainwater collection section of the rainwater collector for collection of rainwater when falling rain is detected, the windshield washer fluid is below the predetermined level and current motor vehicle speed is below a predetermined speed.

In addition the method may include the step of monitoring, by a battery voltage sensor, a battery voltage of the battery of the motor vehicle and preventing opening or closing of the rainwater collector when a detected battery voltage is below a predetermined battery voltage level. Still further, the method may include the step of collecting rainwater with (a) a static rainwater collection section of the rainwater collector when a current speed of the motor vehicle is below a predetermined speed and (b) a dynamic rainwater collection section of the rainwater collector when the current speed of the motor vehicle is above the predetermined speed.

In the following description, there are shown and described several preferred embodiments of the rainwater collection system and the related method of autonomous ecologic rainwater collection for a motor vehicle windshield washer system. As it should be realized, the system and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the rainwater collection system and method of autonomous ecologic rainwater collection and together with the description serve to explain certain principles thereof. In the drawing figures.

Reference will now be made in detail to the present preferred embodiments of the rainwater collection system and related method, examples of which are illustrated in the accompanying drawing figures.

DETAILED DESCRIPTION

Figure 1:
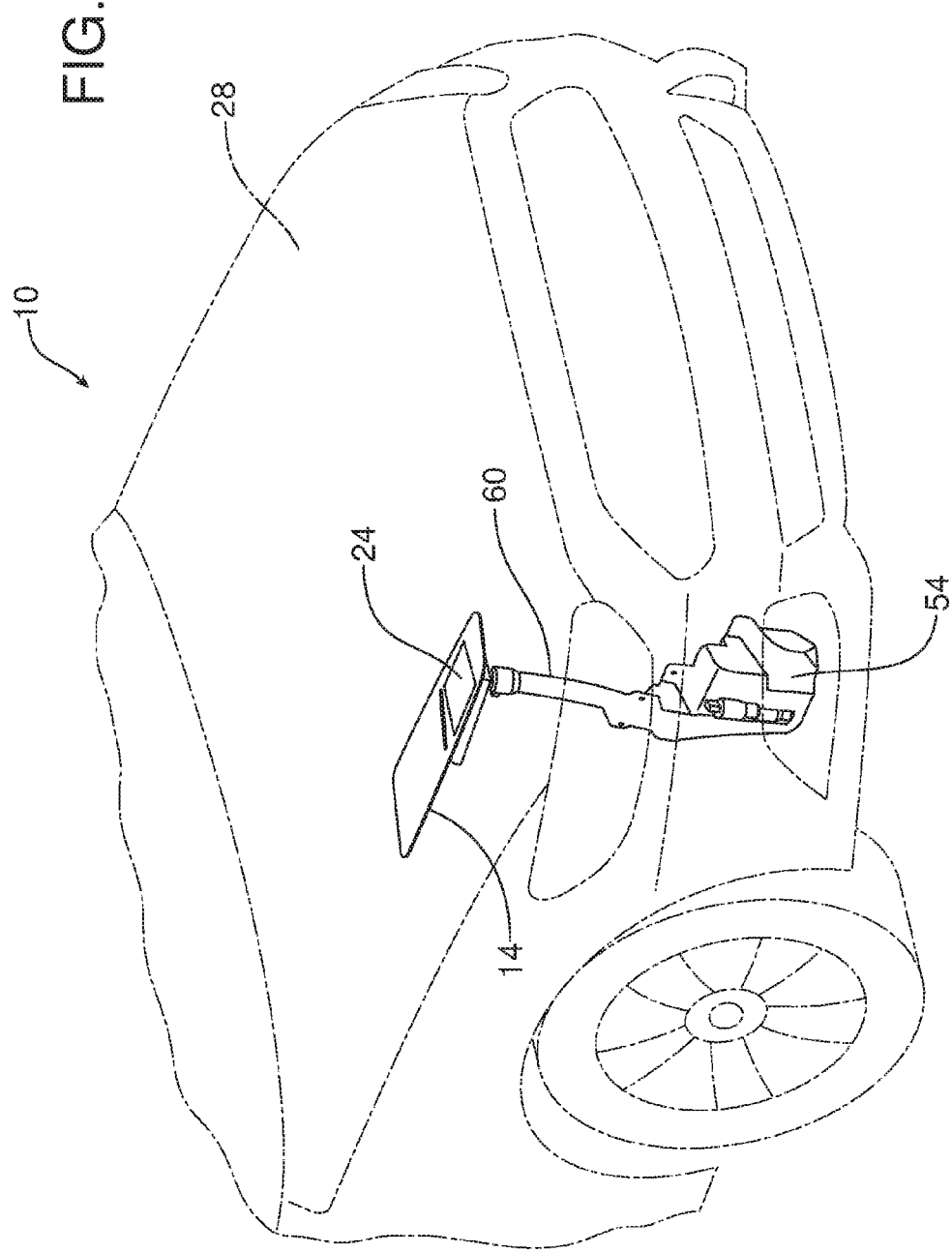
FIG. 1 is a schematic front elevational view of a motor vehicle equipped with the rainwater collection system for delivering rain water through a delivery system to a windshield washer fluid reservoir.
Figure 2:
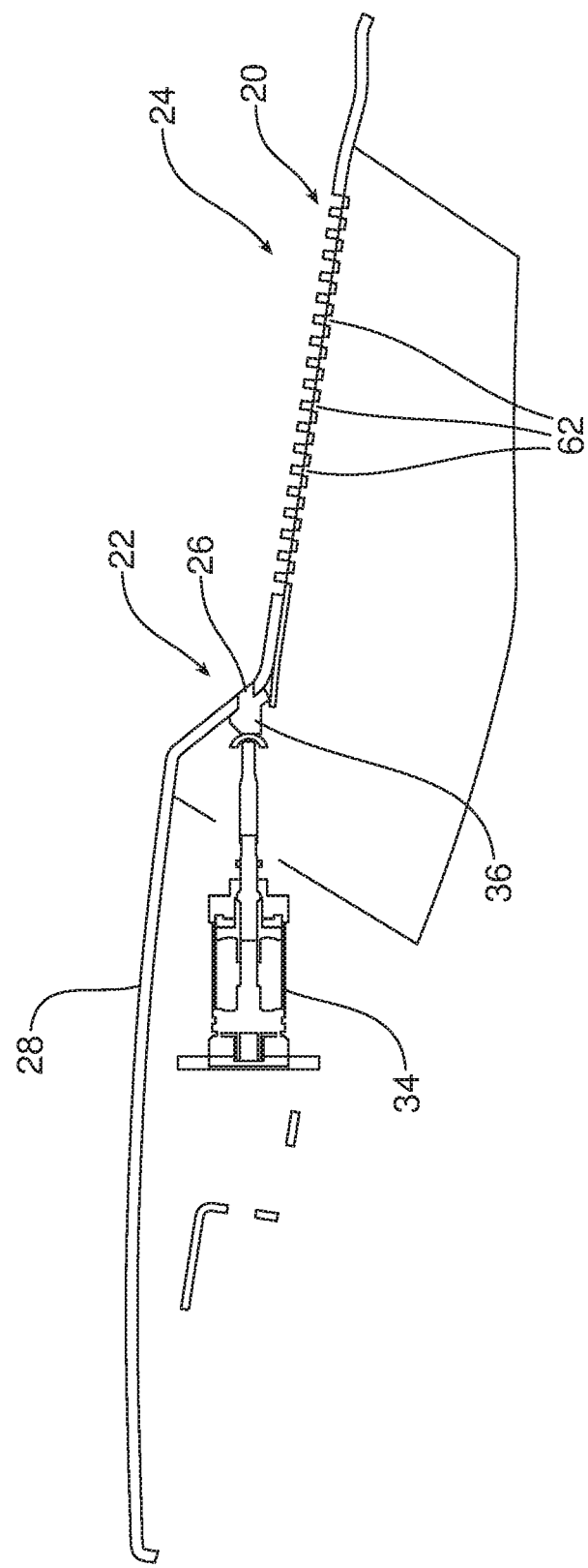
FIG. 2 is a detailed perspective view of the system including the dynamic and static rainwater collection sections of the rainwater collector, the gates for opening and closing the static and dynamic collection sections of that collector and a regulator for opening and closing one of those gates.
Figure 3:
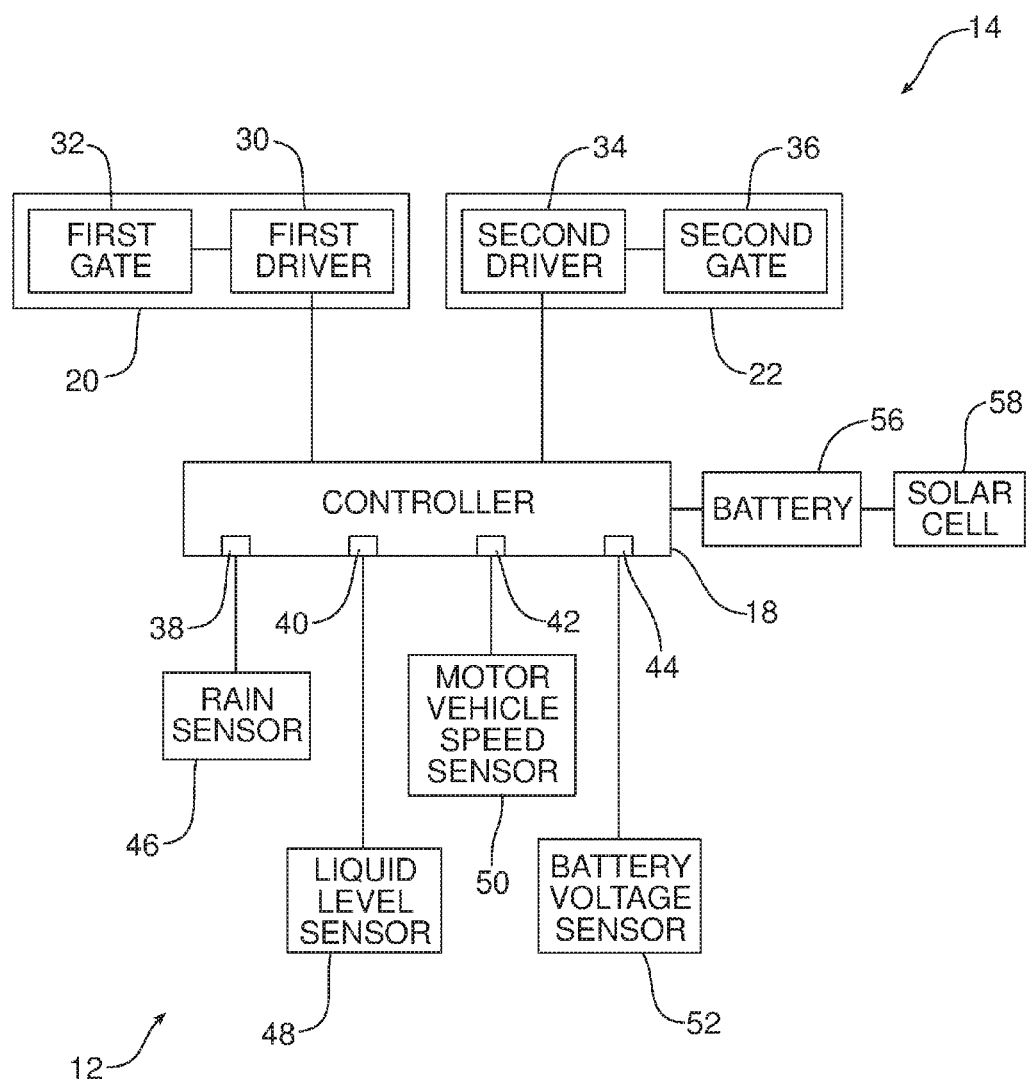
FIG. 3 is a schematic block diagram of the control system of the rainwater collection system.

Reference is now made to FIGS. 1-3 illustrating a motor vehicle 10 equipped with the rainwater collection system 12 having a rainwater collector 14 and a controller 18. In the illustrated embodiment, the rainwater collector 14 includes a static rainwater collection section 20 and a dynamic rainwater collection section 22. As illustrated, the static collection section 20 includes an upwardly opening recess 24 on an exposed surface of the motor vehicle 10 while the dynamic collection section 22 includes an opening 26 directed motor vehicle forward and in communication with the upwardly opening recess. As illustrated, the upwardly opening recess 24 and the forwardly directed opening 26 may both be provided on the hood 28 of the motor vehicle 10 if desired.

The controller 18 comprises a computing device such as a dedicated microprocessor or electronic control unit (ECU) operating in accordance with instructions from appropriate control software. Thus, the controller 18 may include one or more processors, one or more memories and one or more network interfaces that communicate with each other over a communication bus.

In the illustrated embodiment, the controller 18 is connected to a first driver 30 for opening and closing a first gate 32 of the static rainwater collection section 20 and a second driver 34 for opening and closing a second gate 36 of the dynamic rainwater collection section 22. Together, the controller 18 and the first and second drivers 30, 34 comprise a rainwater collection regulator.

As best illustrated in FIG. 3, the controller 18 is configured to include four data inputs 38, 40, 42 and 44. The rainwater collection system 12 includes a rain sensor 46 connected to the data input 38, a liquid level sensor 48 connected to the data input 40, a motor vehicle speed sensor 50 connected to the data input 42, and an optional battery voltage sensor 52 connected to the data input 44. In alternative embodiments not shown, the data inputs 30, 32, 34, and 36 may be connected to other, different devices such as other electronic control units that provide data respecting the level of washer fluid in the washer fluid reservoir 54, rain falling on the motor vehicle 10, the current ground speed of the motor vehicle 10 and the current voltage condition of the primary motor vehicle battery (not shown).

As further illustrated in FIG. 3, the controller 18 is connected to a dedicated power source in the form of a small battery 56 that is connected to and maintained in a charged state by a solar cell 58. The battery 56 provides power to the controller 18 and the first and second drivers 30, 34 (e.g. solenoid, pneumatic piston, hydraulic piston) that are operated by the controller to open and close the gates 32, 36 of the two rainwater collection sections 20, 22. In some embodiments, the rainwater collection system 12 includes a secondary connection to the main battery of the motor vehicle 10 which is used to power the system in the event the solar cell charged battery 56 is depleted but only in the event it is first determined via the voltage sensor 52 that the main battery of the motor vehicle has sufficient charge. The solar cell charged battery 56 is the energy source for the system 12 when the motor vehicle ignition is off, however, if the motor vehicle is running, the main battery is used as the power source.

The rainwater collection system 12 functions to provide a method of autonomous ecologic rainwater collection for a motor vehicle windshield washer system. That method may be broadly described as comprising the steps of monitoring, via a first device or rain sensor 46, the occurrence of rain falling on the motor vehicle 10. That method also includes the step of monitoring, by a second device or liquid level sensor 48, the level of windshield washer fluid in the reservoir 54 of the motor vehicle windshield washer system. In addition, the method includes monitoring, by a third device or motor vehicle speed sensor 50, the current speed of the motor vehicle 10. Still further, the method may include the step of monitoring, by means of a fourth device or battery voltage sensor 52, the battery voltage level of the primary battery of the motor vehicle. In the event that: (a) falling rain is detected by the sensor 46, (b) the washer fluid level is below a predetermined level as detected by the sensor 48, and (c) the battery voltage detected by the sensor 52 is above a predetermined level to provide for operation of the rainwater collection system 12 including the controller 18 and the gate drivers 30, 34, the rainwater collector 14 is opened to collect rain. That collected rain is delivered by a delivery system including a filter (not shown) and a conduit 60 (See FIG. 1) to the washer fluid reservoir 54 of the windshield washer fluid system.

More specifically, the controller 18 compares the current detected ground speed of the motor vehicle 10 to a predetermined speed. If the detected ground speed, as indicated at the data input 42 via signal from the sensor 50, is below the predetermined speed, the controller 18 sends a control signal to the first driver 30 to open the first gate 32 of the static collector section 20. This opens openings 62 at the bottom of the recess 24 allowing water to be collected and delivered to the washer fluid reservoir 54 through the conduit 60. The static rainwater collection section 20, with the upwardly opening recess 24, efficiently collects water when, for example, the motor vehicle is standing still. Thus, it should be appreciated that the rainwater collection system 12 may be used to autonomously collect rainwater even when the vehicle is parked and unattended.

In contrast, if the detected ground speed, as indicated by the sensor 50 at the data input 42, is above the predetermined speed, the controller 18 sends a control signal to the second driver 34 to open the second gate 36 of the dynamic collector section 22 which includes the vehicle forward facing opening 26. Thus, rainwater is swept by air movement across the hood 28 and recess 24 into the opening 26 of the dynamic collector section 22 to provide more efficient and effective collection of rainwater when the motor vehicle 10 is being driven at speed. This collected rainwater is then delivered through the conduit 60 to the washer fluid reservoir 54. In the event the level of washer fluid in the reservoir 54 reaches the predetermined fill level, an appropriate signal from the sensor 48 is received at the data input 40 of the controller 18 and the controller 18 controls the drivers 30, 34 to close any open gate 32, 36 and cease collection of rainwater through the collector 14.

As should be appreciated, the speed of the motor vehicle 10 may vary during rainwater collection. Thus, for example, when the motor vehicle 10 is travelling down the road at a current speed above the predetermined speed, the controller 18 functions to open the gate 36 so as to allow water collection through the dynamic collection section 22 of the rainwater collector 14. The current speed of the motor vehicle 10 is constantly monitored by the sensor 50. Thus, should the motor vehicle 10 come to a stop at a red light, data respecting that change in speed is provided by the sensor 50 to the input 42. The controller 18 responds to that change in speed below the predetermined speed by causing the displacement of the gates 32, 36 so that the dynamic collection section 22 is closed and the static collection section 20 is opened. As should be appreciated, the upwardly opening recess 24 of the static collection section 20 is opportunistically oriented to collect rainwater while the motor vehicle sits at the stop light through the various openings 62 in the bottom wall of the recess. Thus, the most efficient and effective collection of rainwater occurs at substantially any operating speed of the motor vehicle 10.

Figure 4:
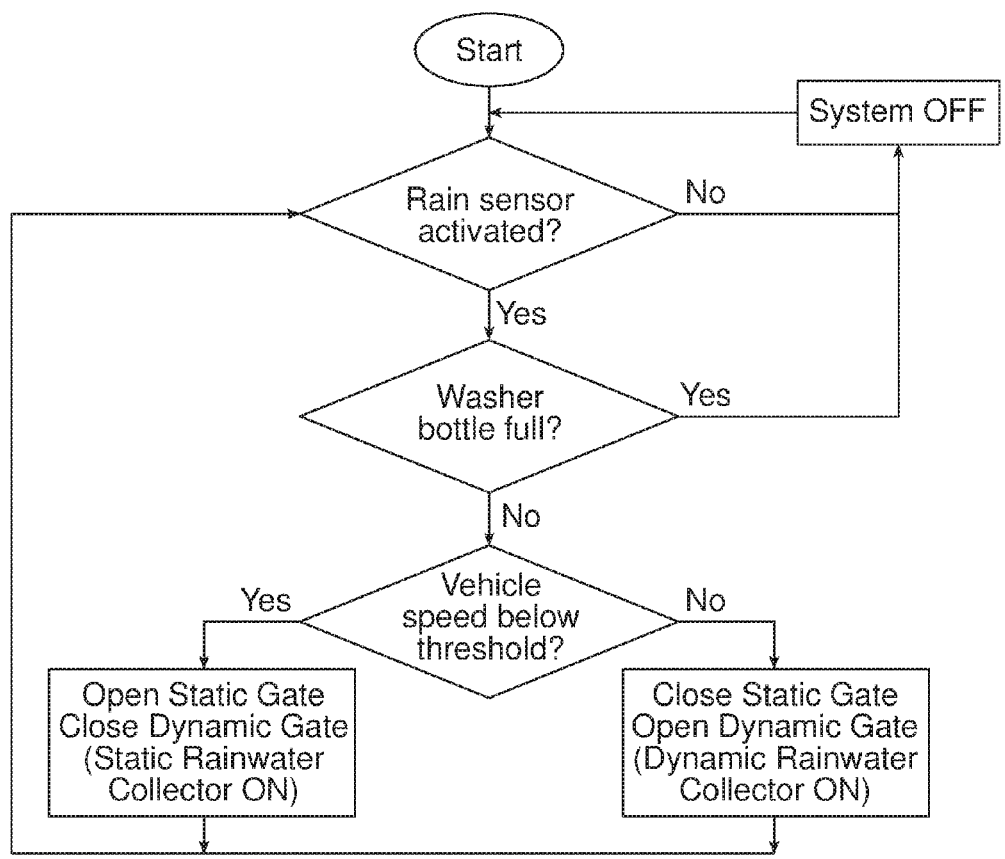
FIG. 4 is a function diagram for explaining the method of autonomous ecological rainwater collection for a motor vehicle windshield washer system.

FIG. 4 is a self-explanatory function diagram that summarizes the preceding description of the method of autonomous ecologic rainwater collection just described.

The foregoing has been presented for purposes of illustration and description. It is not intended to be exhaustive or to limit the embodiments to the precise form disclosed. Obvious modifications and variations are possible in light of the above teachings. For example, the rainwater collection system 12 may not include the solar cell powered battery 56 and the solar cell 58. In such an embodiment, the system 12 is powered by the main battery of the motor vehicle 10. All such modifications and variations are within the scope of the appended claims when interpreted in accordance with the breadth to which they are fairly, legally and equitably entitled.

What is claimed:

1. A rainwater collection system for a motor vehicle, comprising:
   a rainwater collector;
   a gate for said rainwater collector, said gate being displaceable between an opened position and a closed position; and
   a controller configured to open or close said gate in response to data input respecting detection of precipitation, a level of windshield washer fluid in a windshield washer system of said motor vehicle, and a voltage level of a battery of said motor vehicle.

2. The rainwater collection system of claim 1, further including a dedicated battery and a solar cell for charging said dedicated battery.

3. A rainwater collection system for a motor vehicle, comprising:
   a rainwater collector including a static rainwater collection section and a dynamic rainwater collection section;
   a first gate and a first driver for said static rainwater collection section;
   a second gate and a second driver for said dynamic rainwater collection section; and
   a controller configured to open or close said first gate and said second gate in response to data input respecting detection of precipitation and a level of windshield washer fluid in a windshield washer system of said motor vehicle.

4. The rainwater collection system of claim 3, wherein said controller is configured to open or close said first gate of said static rainwater collector section or said second gate of said dynamic rainwater collection system in response to data input respecting a current ground speed of said motor vehicle.

5. The rainwater collection system of claim 4, wherein said rainwater collection system further includes a windshield washer fluid level sensor.

6. The rainwater collection system of claim 4, wherein said rainwater collection system further includes a rain sensor.

7. The rainwater collection system of claim 4, wherein said rainwater collection system further includes a battery voltage level sensor and said controller is configured to have a data input connected to said battery voltage level sensor.

8. The rainwater collection system of claim 4, wherein said rainwater collection system further includes a motor vehicle speed sensor.

9. The rainwater collection system of claim 4, wherein said rainwater collection system further includes a rain sensor, a windshield washer fluid level sensor and a motor vehicle speed sensor.

10. The rainwater collection system of claim 9, wherein said controller is configured to have data inputs connected to said windshield washer fluid level sensor, said rain sensor and said motor vehicle speed sensor.

11. The rainwater collection system of claim 10, wherein said static collection section includes an upwardly opening recess on an exposed surface of said motor vehicle and said dynamic collection section includes an opening directed motor vehicle forward and in communication with said upwardly opening recess.

12. The rainwater collection system of claim 11, wherein said upwardly opening recess and said opening are provided on a hood of said motor vehicle.

13. The rainwater collection system of claim 12, further including a solar cell and a battery for powering said controller and said drive motor.

14. A method of autonomous ecologic rainwater collection for a motor vehicle windshield washer system, comprising:
   monitoring, via a first device, for precipitation;
   monitoring, via a second device, a level of windshield washer fluid in said motor vehicle windshield washer system;
   opening, via a controller, a rainwater collector for collection of rainwater when precipitation is detected and said windshield washer fluid is below a predetermined level; and
   monitoring, by a battery voltage sensor, a battery voltage of a battery of said motor vehicle and preventing opening or closing of said rainwater collector when a detected battery voltage is below a predetermined battery voltage level.

15. The method of claim 14 including monitoring, by a third device, a current speed of said motor vehicle and opening, via a controller, a dynamic rainwater collection section of said rainwater collector for collection of rainwater when said windshield washer fluid is below said predetermined level, rain is detected and current motor vehicle speed is above a predetermined speed.

16. The method of claim 14 including monitoring, by a third device, a current speed of said motor vehicle and opening, via a controller, a static rainwater collection section of said rainwater collector for collection of rainwater when said windshield washer fluid is below said predetermined level, rain is detected and current motor vehicle speed is below a predetermined speed.

17. The method of claim 14 including collecting rainwater with (a) a static rainwater collection section of said rainwater collector when a current speed of said motor vehicle is below a predetermined speed and (b) a dynamic rainwater collection section of said rainwater collector when said current speed of said motor vehicle is above said predetermined speed.

* * * * *